United States Patent
Yang et al.

(10) Patent No.: US 10,784,978 B2
(45) Date of Patent: Sep. 22, 2020

(54) METHOD AND DEVICE FOR TRANSMITTING/RECEIVING WIRELESS SIGNALS IN WIRELESS COMMUNICATION SYSTEM

(71) Applicant: LG ELECTRONICS INC., Seoul (KR)

(72) Inventors: Suckchel Yang, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/070,195

(22) PCT Filed: Jan. 13, 2017

(86) PCT No.: PCT/KR2017/000501
§ 371 (c)(1),
(2) Date: Jul. 13, 2018

(87) PCT Pub. No.: WO2017/123062
PCT Pub. Date: Jul. 20, 2017

(65) Prior Publication Data
US 2019/0028225 A1   Jan. 24, 2019

Related U.S. Application Data

(60) Provisional application No. 62/277,983, filed on Jan. 13, 2016, provisional application No. 62/404,265, filed on Oct. 5, 2016.

(51) Int. Cl.
*H04W 72/04* (2009.01)
*H04J 11/00* (2006.01)
(Continued)

(52) U.S. Cl.
CPC .......... *H04J 11/0079* (2013.01); *H04J 11/00* (2013.01); *H04J 11/0073* (2013.01);
(Continued)

(58) Field of Classification Search
CPC .... H04J 11/0079; H04J 11/0073; H04J 11/00; H04W 72/042; H04W 72/0406;
(Continued)

(56) References Cited

U.S. PATENT DOCUMENTS

2012/0113827 A1* 5/2012 Yamada ................ H04L 1/0031
370/252
2013/0107832 A1* 5/2013 Kim ...................... H04B 7/024
370/329
(Continued)

FOREIGN PATENT DOCUMENTS

KR  10-2009-0101043 A   9/2009
KR  10-2011-0134305 A  12/2011
(Continued)

OTHER PUBLICATIONS

R1-156517: 3GPP TSG RAN WG1 Meeting #83, Anaheim, USA, Nov. 15-22, 2015, Intel Corporation, Further Details of partial subframe, pp. 1-5.
(Continued)

*Primary Examiner* — Hoang-Chuong Q Vu
(74) *Attorney, Agent, or Firm* — Dentons US LLP

(57) ABSTRACT

The present invention relates to a wireless communication system and particularly to a method and a device therefor, the method comprising the steps of: monitoring control channel candidates in a common search space and a UE-specific search space on subframe #n so as to receive downlink control information; and transmitting, in subframe #n+k, an uplink signal associated with the downlink control information, wherein the value of k is determined based on the search space in which the downlink control information is detected, and the common and UE-specific search spaces correspond to different values of k.

8 Claims, 14 Drawing Sheets

(51) Int. Cl.
*H04L 1/18* (2006.01)
*H04L 5/00* (2006.01)

(52) U.S. Cl.
CPC .......... *H04L 1/1812* (2013.01); *H04L 1/1854* (2013.01); *H04L 5/0055* (2013.01); *H04W 72/042* (2013.01)

(58) Field of Classification Search
CPC . H04W 72/0446; H04W 72/12; H04W 48/12; H04W 72/04; H04W 72/1278; H04L 5/0053; H04L 1/0046; H04L 1/1854; H04L 1/06
See application file for complete search history.

(56) References Cited

U.S. PATENT DOCUMENTS

| | | | | |
|---|---|---|---|---|
| 2013/0343307 | A1* | 12/2013 | Desai | H04W 74/04 370/329 |
| 2014/0146768 | A1* | 5/2014 | Seo | H04W 24/08 370/329 |
| 2015/0063231 | A1* | 3/2015 | Seo | H04W 72/042 370/329 |
| 2015/0117294 | A1* | 4/2015 | Li | H04W 72/0446 370/312 |
| 2015/0358985 | A1 | 12/2015 | Chen et al. | |
| 2016/0219618 | A1* | 7/2016 | Rico Alvarino | H04W 72/1294 |
| 2016/0249337 | A1* | 8/2016 | Liang | H04W 72/042 |
| 2017/0171014 | A1* | 6/2017 | Chen | H04L 1/0003 |
| 2017/0272200 | A1* | 9/2017 | Dinan | H04L 1/001 |
| 2017/0353285 | A1* | 12/2017 | Yang | H04L 5/00 |
| 2018/0014301 | A1* | 1/2018 | Chen | H04L 1/1812 |
| 2018/0019842 | A1* | 1/2018 | Fu | H04L 1/1854 |
| 2018/0192434 | A1* | 7/2018 | Lee | H04W 72/04 |
| 2018/0213530 | A1* | 7/2018 | Mochizuki | H04W 72/0446 |
| 2018/0249487 | A1* | 8/2018 | Takeda | H04J 11/00 |
| 2019/0393976 | A1* | 12/2019 | Dinan | H04W 72/042 |

FOREIGN PATENT DOCUMENTS

| | | |
|---|---|---|
| KR | 10-2015-0056450 A | 5/2015 |
| KR | 10-2015-0104123 A | 9/2015 |
| WO | 2013181515 A2 | 12/2013 |
| WO | 2015122629 A1 | 8/2015 |
| WO | 2018017489 A1 | 1/2018 |

OTHER PUBLICATIONS

R1-135386: 3GPP TSG RAN WG1 Meeting #75, San Francisco, USA, Nov. 11-15, 2013, Huawei, HiSilicon, "Physical channel design for D2D communication," pp. 1-6.

Yi et al., "The Search Space Design for Enhanced Downlink Control Channel in LTE-Advanced System," Fujitsu Research and Development Center Co. Ltd. Beijing, China, 2012, pp. 322-326.

QUALCOMM Inc.: "Physical channel time and frequency relationship", R1-153845, 3GPP TSG RAN WG1 Meeting #82, Beijing, China, Aug. 24-28, 2015.

NTT DOCOMO: "Views on the remaining issues of timing relationship", R1-157343, 3GPP TSG RAN WG1 Meeting #83, Anaheim, USA, Nov. 15-22, 2015.

* cited by examiner

PUSCH-PHICH/UL grant timing (UL-DL configuration #1)

HARQ processes in UL-DL configuration #1

METHOD AND DEVICE FOR TRANSMITTING/RECEIVING WIRELESS SIGNALS IN WIRELESS COMMUNICATION SYSTEM

CROSS REFERENCE TO RELATED APPLICATIONS

This application is the National Phase of PCT International Application No. PCT/KR2017/000501, filed on Jan. 13, 2017, which claims priority under 35 U.S.C. 119(e) to U.S. Provisional Application Nos. 62/277,983, filed on Jan. 13, 2016 and 62/404,265 filed on Oct. 5, 2016, all of which are hereby expressly incorporated by reference into the present application.

TECHNICAL FIELD

The present invention relates to a wireless communication system, and more particularly, to a method and apparatus for transmitting/receiving a wireless signal. The wireless communication system includes a CA-based (Carrier Aggregation-based) wireless communication system.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE

Technical Problem

It is an object of the present invention to provide a method and apparatus for efficiently performing operations of transmission and reception of a wireless signal.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

In one aspect of the present invention, a method for transmitting an uplink signal by a user equipment (UE) in a wireless communication system includes: monitoring control channel candidates in a common search space and a UE-specific search space on a subframe #n to receive downlink control information; and transmitting, in subframe #n+k, an uplink signal associated with the downlink control information, wherein the value of k is determined based on a search space in which the downlink control information is detected, and the common and UE-specific search spaces correspond to different values of k.

In another aspect of the present invention, a UE used in a wireless communication system includes a radio frequency (RF) module and a processor, wherein the processor is configured to monitor control channel candidates in a common search space and a UE-specific search space on a subframe #n to receive downlink control information and to transmit, in subframe #n+k, an uplink signal associated with the downlink control information, wherein the value of k is determined based on a search space in which the downlink control information is detected, and the common and UE-specific search spaces correspond to different values of k.

Preferably, k may be k1 when the downlink control information is detected in the common search space and k may be k2 when the downlink control information is detected in the UE-specific search space, k1 being greater than k2.

Preferably, when (i) transmission of a first uplink signal associated with downlink control information detected in a common search space of a subframe #m−k1 and (ii) transmission of a second uplink signal associated with downlink control information detected in a UE-specific search space of the subframe #m−k2 are simultaneously requested in a subframe #m, transmission of the first uplink signal may be dropped.

Preferably, the downlink control information may include uplink scheduling information and the uplink signal may include uplink data. The downlink control information may be received through a Physical Downlink Control Channel (PDCCH) and the uplink signal may be transmitted through a Physical Uplink Shared Channel (PUSCH).

Preferably, the wireless communication system may include a Long Term Evolution (LTE)-based wireless communication system.

Advantageous Effects

According to embodiments of the present invention, wireless signal transmission and reception can be efficiently performed in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

Figure 1:
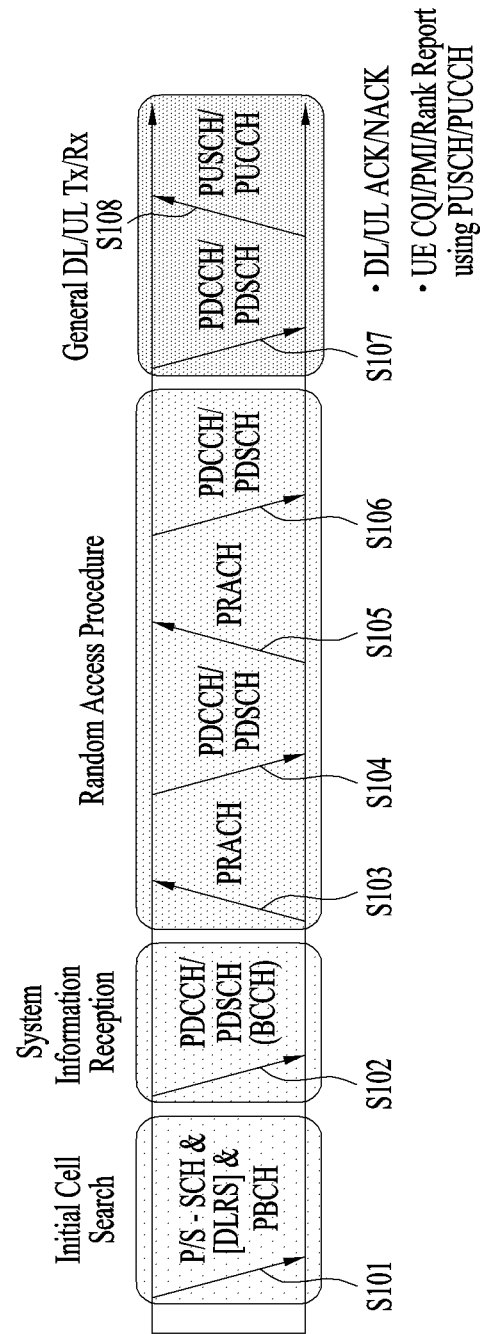
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
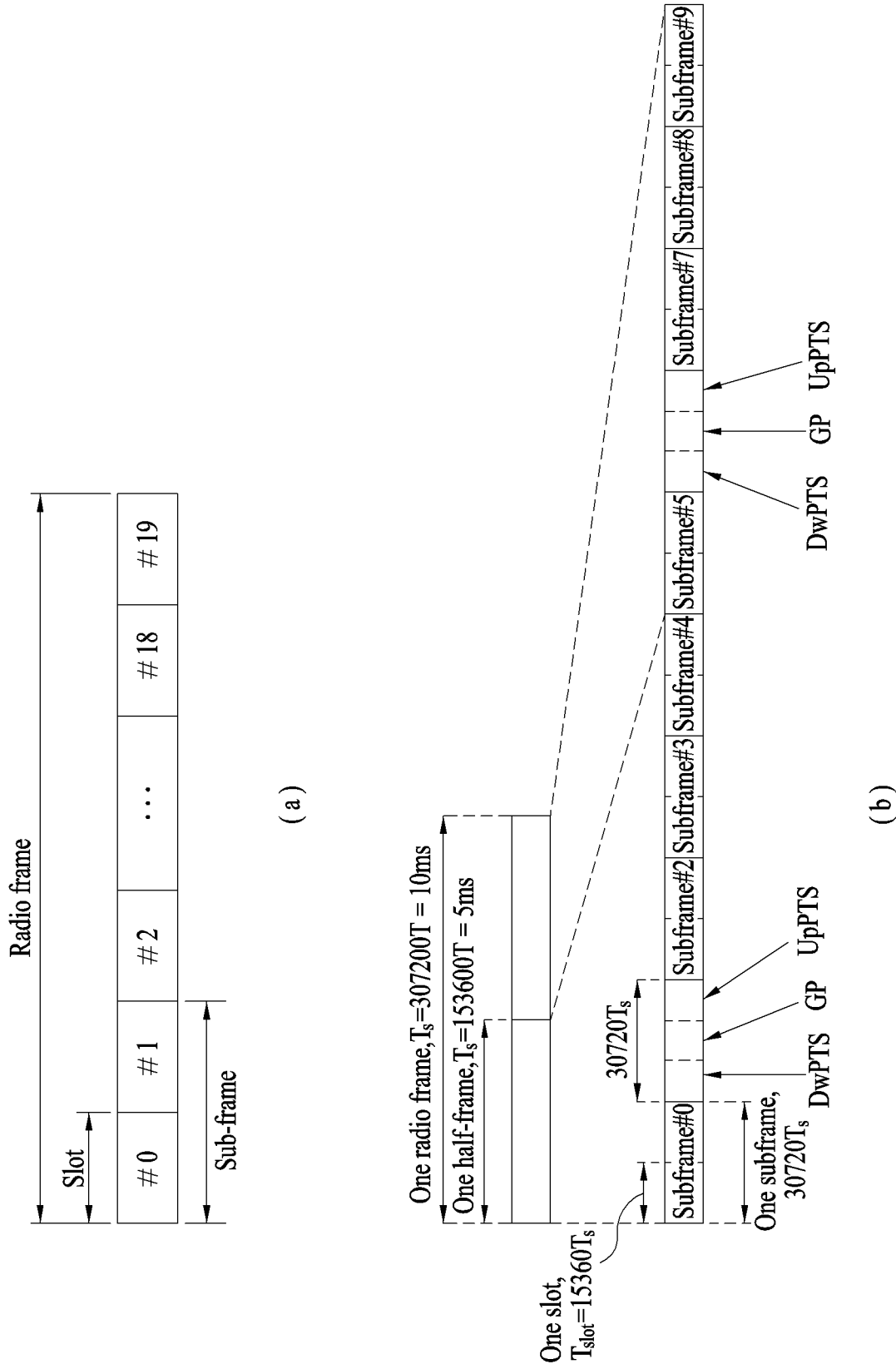
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(*a*) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
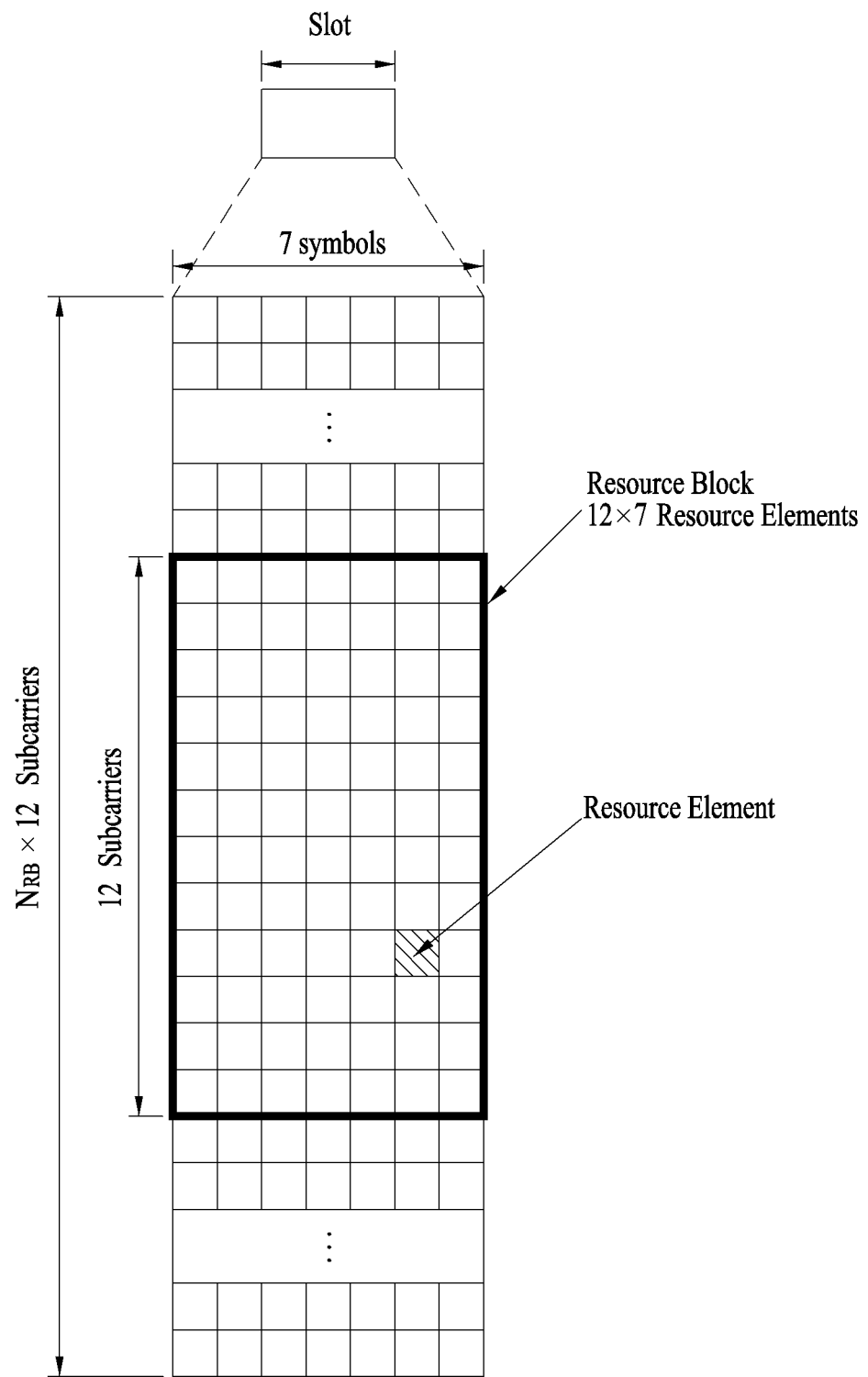
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
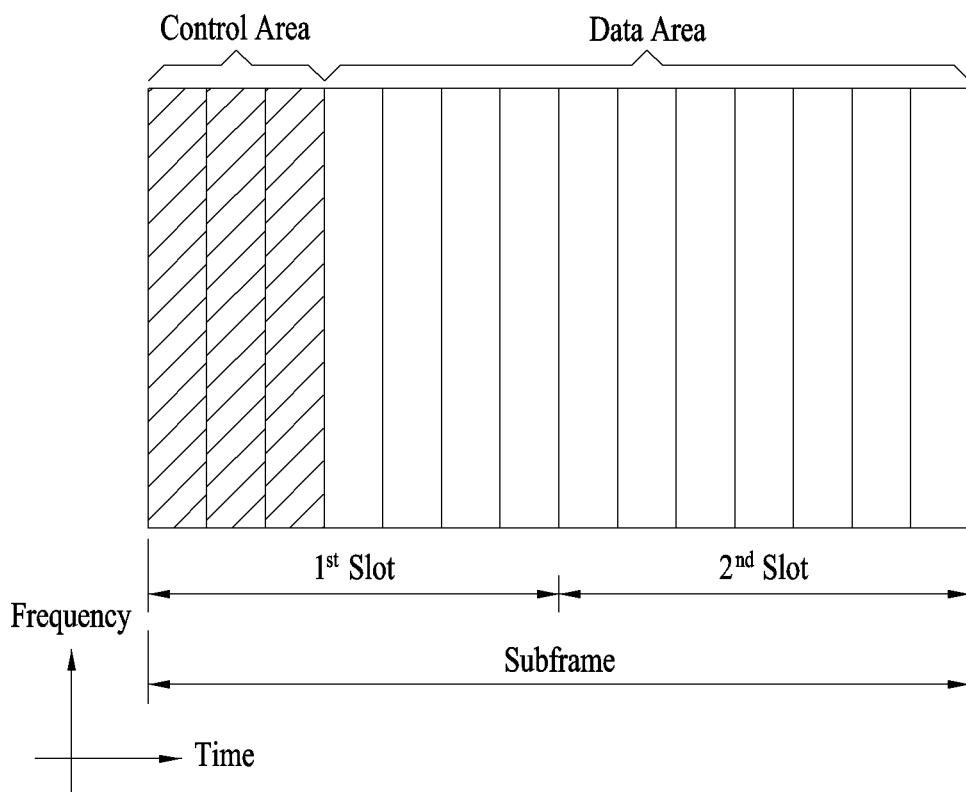
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. A arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Figure 5:
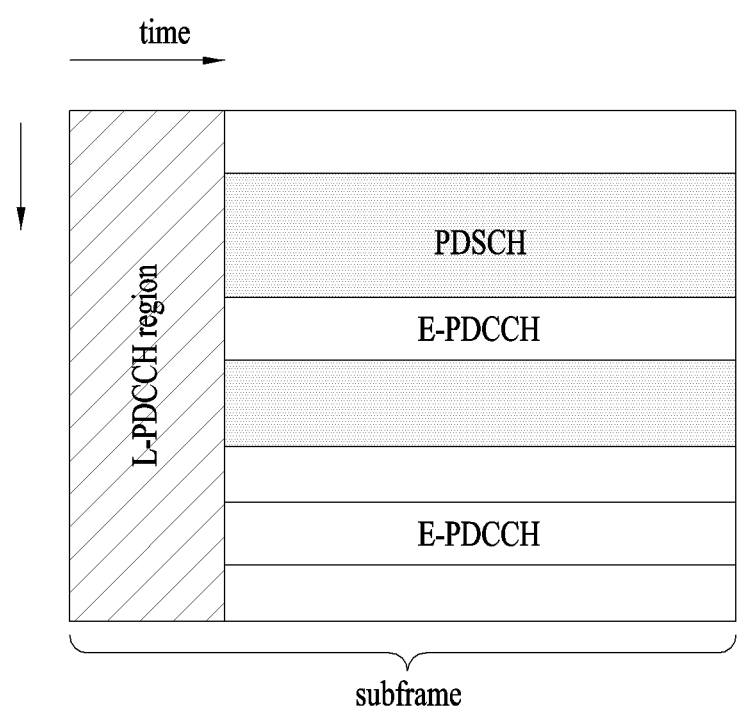
FIG. 5 illustrates an example of Enhanced Physical Downlink Control Channel (EPDCCH).

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Single-antenna port (port5) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. In this specification, the PDCCH includes both L-PDCCH and EPDCCH unless otherwise noted.

Figure 6:
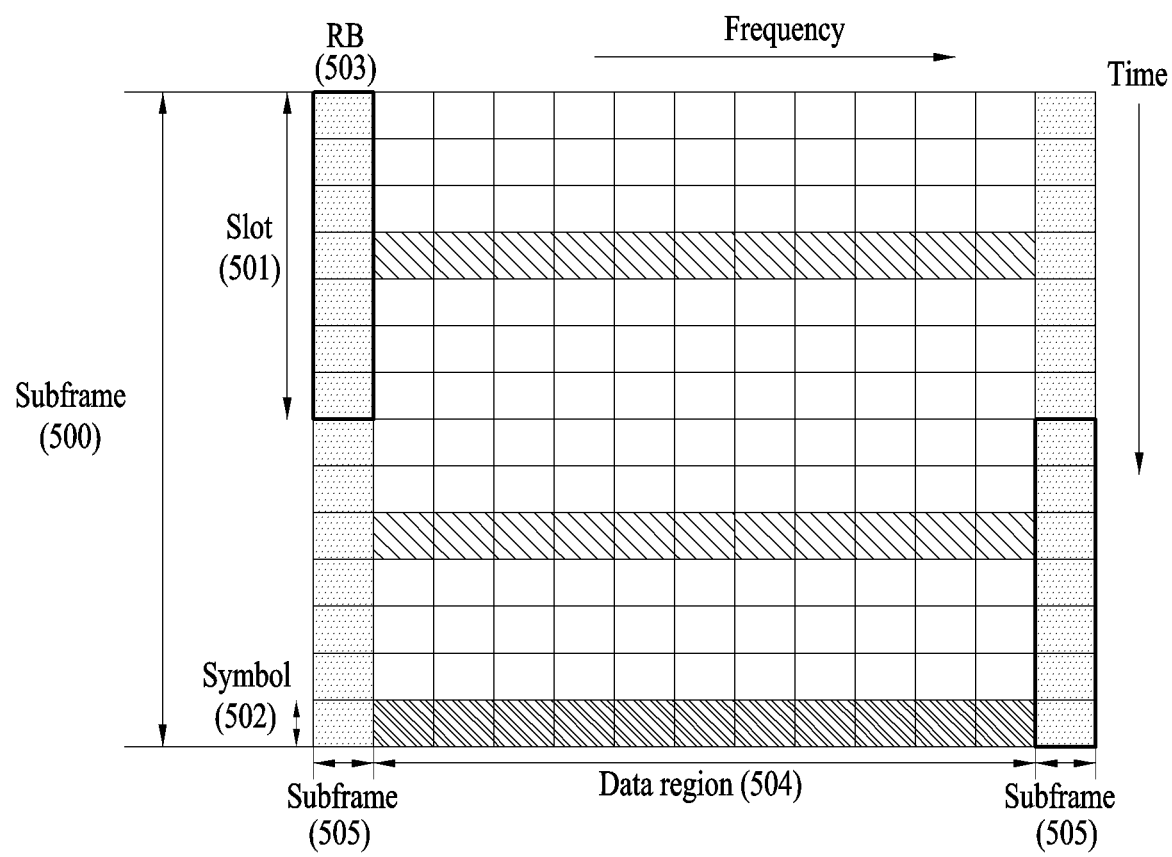
FIG. 6 illustrates the structure of an uplink subframe used in LTE(-A).

FIG. 6 illustrates a structure of an uplink subframe used in LTE(-A).

Referring to FIG. 6, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

Figure 7:
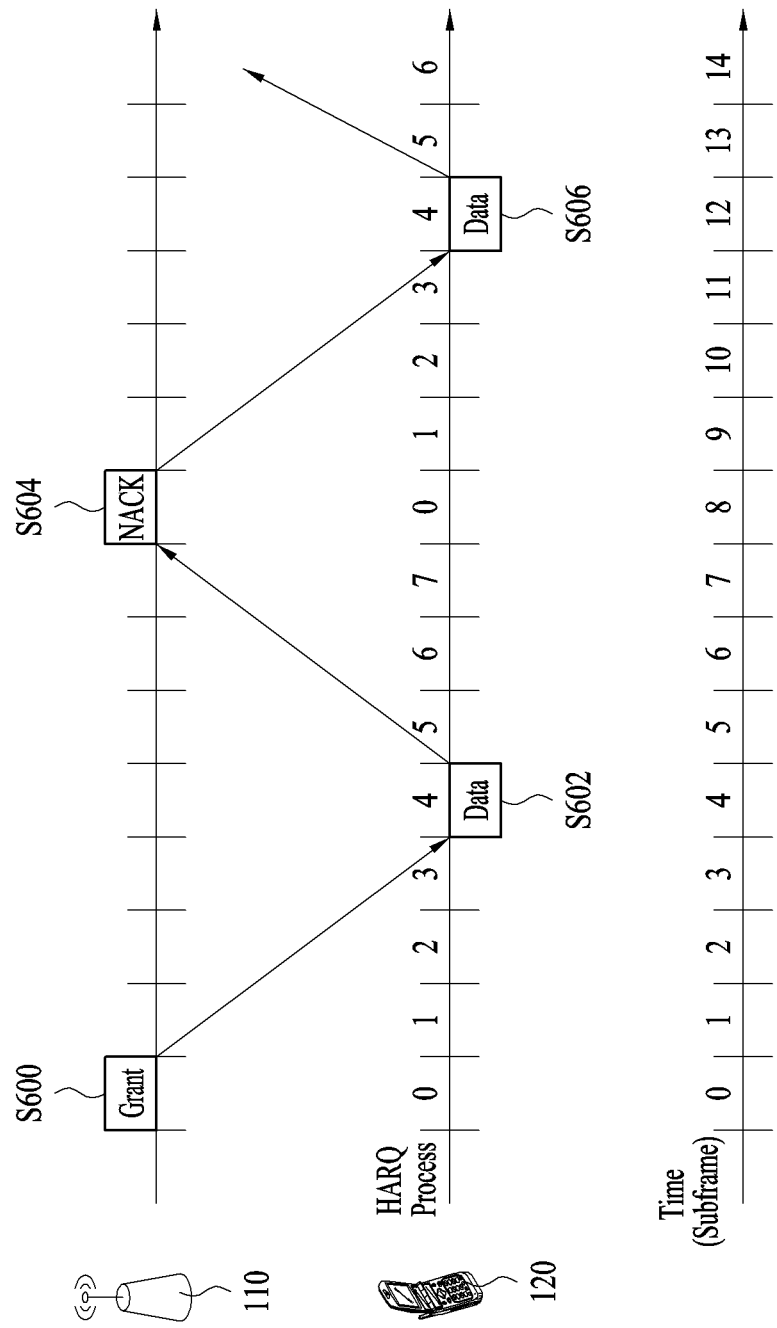
FIG. 7 illustrates UL HARQ (Uplink Hybrid Automatic Repeat reQuest) operation.

FIG. 7 illustrates uplink-downlink frame timing relation.

Referring to FIG. 7, transmission of the uplink radio frame number i starts prior to $(N_{TA}+N_{TAoffset})*T_s$ seconds from the start of the corresponding downlink radio frame. In case of the LTE system, $0 \le N_{TA} \le 20512$, $N_{TAoffset}=0$ in FDD, and $N_{TAoffset}=624$ in TDD. The value $N_{Taoffset}$ is a value in advance recognized by the BS and the UE. If $N_{TA}$ is indicated through a timing advance command during a random access procedure, the UE adjusts transmission timing of UL signal (e.g., PUCCH/PUSCH/SRS) through the above equation. UL transmission timing is set to multiples of $16T_s$. The timing advance command indicates the change of the UL timing based on the current UL timing. The timing advance command $T_A$ within the random access response is a 11-bit timing advance command, and indicates values of 0, 1, 2, ..., 1282 and a timing adjustment value is given by $N_{TA}=T_A*16$. In other cases, the timing advance command $T_A$ is a 6-bit timing advance command, and indicates values of 0, 1, 2, ..., 63 and a timing adjustment value is given by $N_{TA,new}=N_{TA,old}+(T_A-31)*16$. The timing advance command received at subframe n is applied from the beginning of subframe n+6. In case of FDD, as shown, transmitting timing of UL subframe n is advanced based on the start time of the DL subframe n. On the contrary, in case of TDD, transmitting timing of UL subframe n is advanced based on the end time of the DL subframe n+1 (not shown).

Next, HARQ (Hybrid Automatic Repeat reQuest) will be described. When there are a plurality of UEs having data to be transmitted on uplink/downlink in a wireless communication, an eNB selects UEs which will transmit data per transmission time internal (TTI) (e.g., subframe). In a system using multiple carriers and the like, an eNB selects UEs which will transmit data on uplink/downlink per TTI and also selects a frequency band to be used for data transmission of the corresponding UEs.

When description is based on uplink (UL), UEs transmit reference signals (or pilot signals) on uplink and an eNB detects channel states of the UEs using the reference signals transmitted from the UEs and selects UEs which will transmit data on uplink in each unit frequency band per TTI. The eNB notifies the UEs of the result of selection. That is, the eNB transmits, to UL scheduled UEs, a UL assignment message indicating that the UEs may transmit data using a specific frequency band in a specific TTI. The UL assignment message is also referred to as a UL grant. The UEs transmit data on uplink according to the UL assignment message. The UL assignment message may include UE identity (ID), RB allocation information, a modulation and coding scheme (MCS), a redundancy version (RV), new data indication (NDI) and the like.

In the case of synchronous HARQ, a retransmission time is appointed in the system (e.g., after 4 subframes from a NACK reception time) (synchronous HARQ). Accordingly, the eNB may send a UL grant message to UEs only in initial transmission and subsequent retransmission is performed according to an ACK/NACK signal (e.g., PHICH signal). In the case of asynchronous HARQ, a retransmission time is not appointed and thus the eNB needs to send a retransmission request message to UEs. Further, frequency resources or an MCS for retransmission are identical to those in previous transmission in the case of non-adaptive HARQ, whereas frequency resources or an MCS for retransmission may differ from those in previous transmission in the case of adaptive HARQ. For example, in the case of asynchronous adaptive HARQ, the retransmission request message may include UE ID, RB allocation information, HARQ process ID/number, RV and NDI information because frequency resources or an MCS for retransmission vary with transmission time.

FIG. 7 illustrates a UL HARQ operation in an LTE(-A) system. In the LTE(-A) system, asynchronous adaptive HARQ is used as UL HARQ. When 8-channel HARQ is used, 0 to 7 are provided as HARQ process numbers. One HARQ process operates per TTI (e.g., subframe). Referring to FIG. 7, a UL grant is transmitted to a UE 120 through a PDCCH (S600). The UE 120 transmits UL data to an eNB 110 after 4 subframes from the time (e.g., subframe 0) at which the UL grant is received using an RB and an MCS designated by the UL grant (S602). The eNB 110 decodes the UL data received from the UE 120 and then generates ACK/NACK. When decoding of the UL data fails, the eNB 110 transmits NACK to the UE 120 (S604). The UE 120 retransmits the UL data after 4 subframes from the time at which NACK is received (S606). Initial transmission and retransmission of the UL data are performed through the same HARQ process (e.g., HARQ process 4). ACK/NACK information may be transmitted through a PHICH.

A description will be given of TDD signal transmission timing in a single carrier (or cell) situation with reference to FIGS. 8 to 14.

Figure 8:
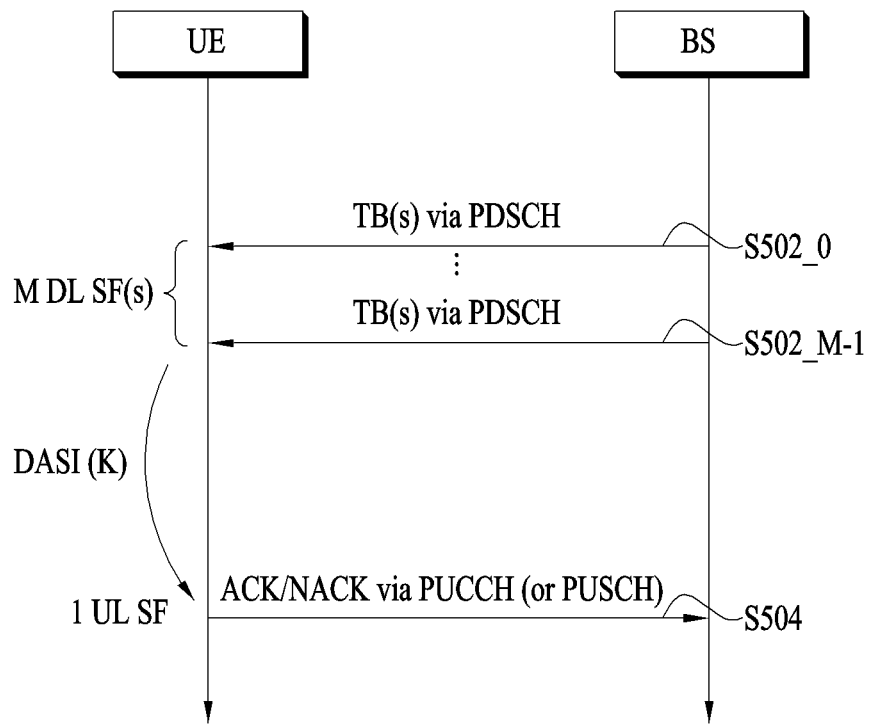
FIGS. 8 and 9 illustrate TDD UL ACK/NACK (Uplink Acknowledgement/Negative Acknowledgement) transmission timing in a single cell case.
Figure 9:
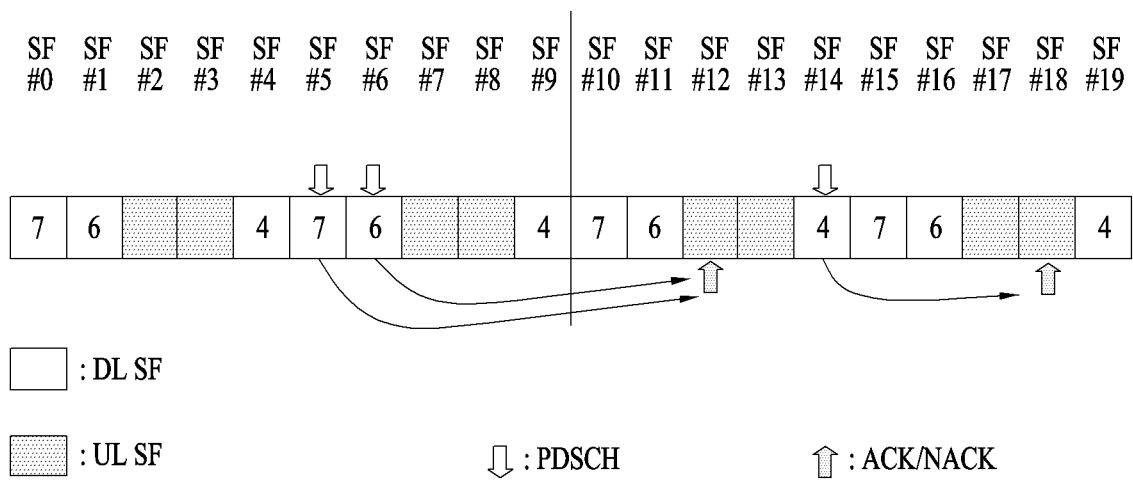

FIGS. 8 and 9 illustrate PDSCH-UL ACK/NACK timing. Here, UL ACK/NACK refers to ACK/NACK transmitted on uplink in response to DL data (e.g., PDSCH).

Referring to FIG. 8, a UE can receive one or more PDSCH signals in M DL subframes (SFs) (S502_0 to S502_M−1). Each PDSCH signal is used to transmit one or more (e.g. 2) transport blocks (TBs) according to transmission mode. A PDCCH signal indicating SPS (Semi-Persistent Scheduling) may also be received in step S502_0 to S502_M−1, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK is transmitted through a PUCCH basically, ACK/NACK is transmitted through a PUSCH when a PUSCH is transmitted at ACK/NACK transmission time. Various PUCCH formats shown in Table 3 can be used for ACK/NACK transmission. To reduce the number of ACK/NACK bits transmitted through a PUCCH format, various methods such as ACK/NACK bundling and ACK/NACK channel selection can be used.

As described above, in TDD, ACK/NACK relating to data received in the M DL subframes is transmitted through one UL subframe (i.e. M DL SF(s): 1 UL SF) and the relationship therebetween is determined by a DASI (Downlink Association Set Index).

Table 4 shows DASI (K: {k0, k1, k−1}) defined in LTE(-A). Table 4 shows spacing between a UL subframe transmitting ACK/NACK and a DL subframe relating to the UL subframe. Specifically, when a PDCCH that indicates PDSCH transmission and/or SPS release is present in a subframe n−k (k∈K), the UE transmits ACK/NACK in a subframe n.

TABLE 4

| TDD UL-DL Config- | Subframe n | | | | | | | | | |
|---|---|---|---|---|---|---|---|---|---|---|
| uration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

FIG. 9 illustrates UL ACK/NACK transmission timing when UL-DL configuration #1 is configured. In the figure, SF#0 to #9 and SF#10 to #19 respectively correspond to radio frames, and numerals in blocks denote UL subframes relating to DL subframes. For example, ACK/NACK for a PDSCH of SF#5 is transmitted in SF#5+7 (=SF#12) and ACK/NACK for a PDSCH of SF#6 is transmitted in SF#6+6 (=SF#12). Accordingly, both ACKs/NACKs for DL signals of SF#5/#6 are transmitted in SF#12. Similarly, ACK/NACK for a PDSCH of SF#14 is transmitted in SF#14+4 (=SF#18).

Figure 10:
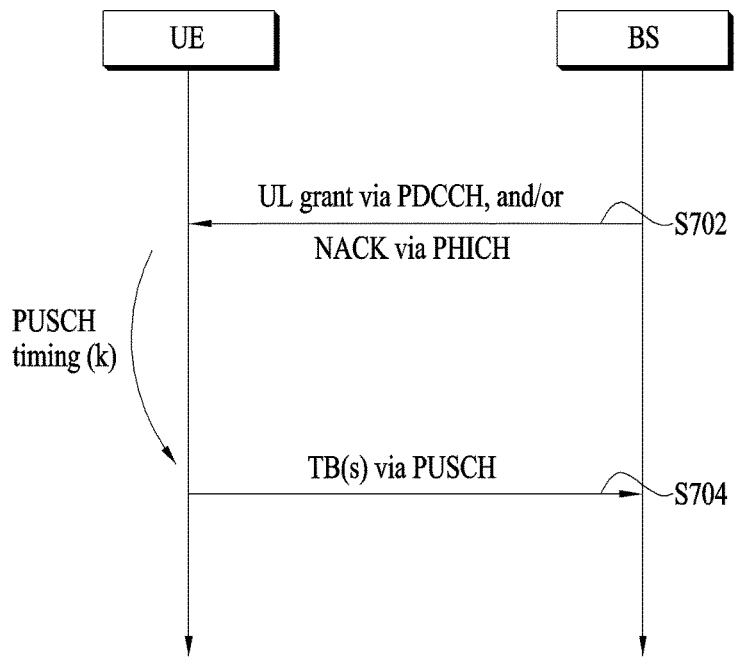
FIGS. 10 and 11 illustrate TDD PUSCH (Physical Uplink Shared Channel) transmission timing in a single cell case.
Figure 11:
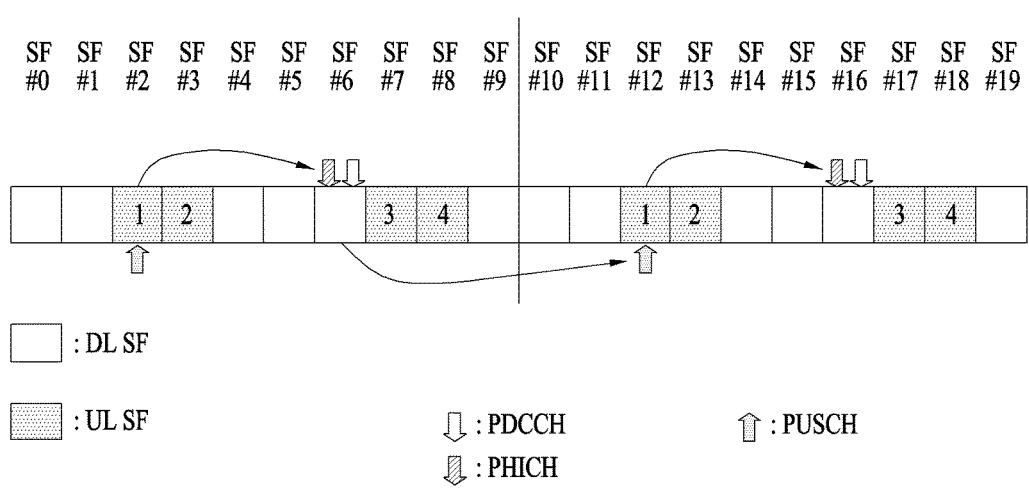

FIGS. 10 and 11 illustrate PHICH grant-PUSCH timing. A PUSCH can be transmitted corresponding to a PDCCH (UL grant) and/or a PHICH (NACK).

Referring to FIG. 10, the UE can receive a PDCCH (UL grant) and/or a PHICH (NACK) through a PDCCH (S702). Here, NACK corresponds to an ACK/NACK response to previous PUSCH transmission. In this case, the UE can initially transmit/retransmit one or more TBs through a PUSCH after k subframes via processes for PUSCH transmission (e.g. TB coding, TB-CW swiping, PUSCH resource allocation, etc.) (S704). The present embodiment is based on the assumption that a normal HARQ operation in which a PUSCH is transmitted once is performed. In this case, a PHICH and a UL grant corresponding to PUSCH transmission are present in the same subframe. However, in case of subframe bundling in which a PUSCH is transmitted multiple times through a plurality of subframes, a PHICH and a UL grant corresponding to PUSCH transmission may be present in different subframes.

Table 5 shows a UAI (Unlink Association Index) (k) for PUSCH transmission in LTE(-A). Table 5 shows spacing between a DL subframe from which a PHICH/UL grant is detected and a UL subframe relating to the DL subframe. Specifically, when a PHICH/UL grant is detected from a subframe n, the UE can transmit a PUSCH in a subframe n+k.

TABLE 5

| TDD UL-DL Config- | subframe number n | | | | | | | | | |
|---|---|---|---|---|---|---|---|---|---|---|
| uration | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | 4 | | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 11 illustrates PUSCH transmission timing when UL-DL configuration #1 is configured. In the figure, SF#0 to #9 and SF#10 to #19 respectively correspond to radio frames, and numerals in blocks denote UL subframes relating to DL subframes. For example, a PUSCH corresponding to PHICH/UL grant of SF#6 is transmitted in SF#6+6 (=SF#12) and a PUSCH corresponding to a PHICH/UL grant of SF#14 is transmitted in SF#14+4 (=SF#18).

Figure 12:
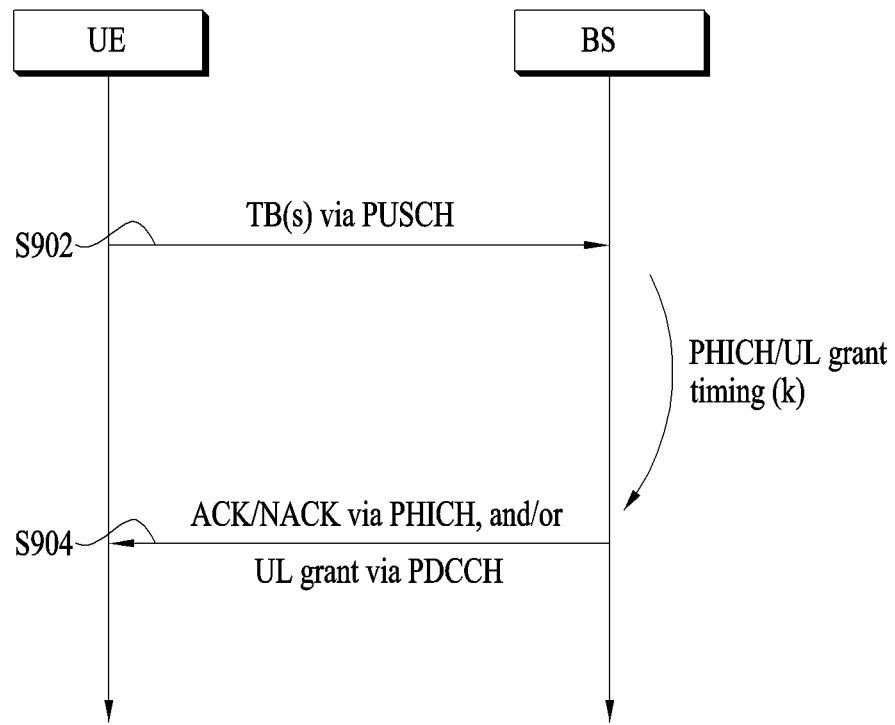
FIGS. 12 and 13 illustrate TDD DL ACK/NACK transmission timing in a single cell case.
Figure 13:
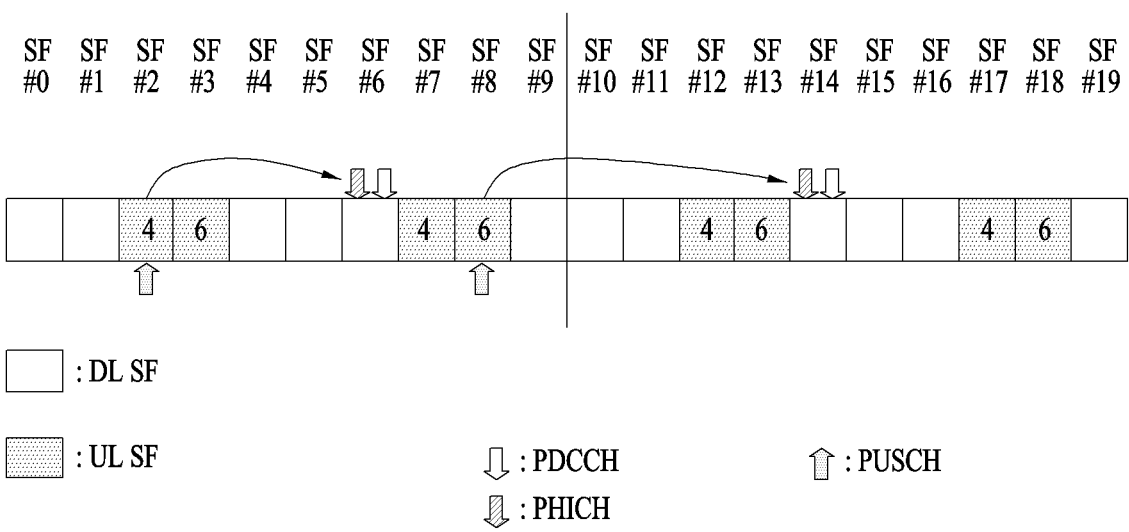

FIGS. 12 and 13 illustrate PUSCH-PHICH/UL grant timing. A PHICH is used to transmit DL ACK/NACK. Here, DL ACK/NACK means ACK/NACK transmitted on downlink as a response to UL data (e.g. PUSCH).

Referring to FIG. 12, the UE transmits a PUSCH signal to the BS (S902). Here, the PUSCH signal is used to transmit one or a plurality of (e.g. 2) TBs according to transmission mode. The BS can transmit ACK/NACK as a response to PUSCH transmission through a PHICH after k subframes via processes for ACK/NACK transmission (e.g. ACK/NACK generation, ACK/NACK resource allocation, etc.) (S904). ACK/NACK includes acknowledgement information about the PUSCH signal of step S902. When a response to PUSCH transmission is NACK, the BS can transmit a UL grant PDCCH for PUSCH retransmission to the UE after k subframe (S904). The present embodiment is based on the assumption that a normal HARQ operation in which a PUSCH is transmitted once is performed. In this case, a PHICH and UL grant used for PUSCH transmission can be transmitted in the same subframe. In case of subframe bundling, however, the PHICH and UL grant used for PUSCH transmission can be transmitted in different subframes.

Table 6 shows a UAI for PHICH/UL grant transmission in LTE(-A). Table 6 shows spacing between a DL subframe in which a PHICH/UL grant is present and a UL subframe relating to the DL subframe. Specifically, a PHICH/UL grant of a subframe i corresponds to PUSCH transmission through a subframe i−k.

TABLE 6

| TDD UL-DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | | 4 | | 6 |
| 2 | | | | 6 | | | | 6 | | |
| 3 | 6 | | | | | | | 6 | 6 | |
| 4 | | | | | | | | 6 | 6 | |
| 5 | | | | | | | 6 | | | |
| 6 | 6 | 4 | | | | 7 | 4 | | | 6 |

FIG. 13 illustrates PHICH/UL grant transmission timing when UL-DL configuration #1 is configured. In the figure, SF#0 to #9 and SF#10 to #19 respectively correspond to radio frames, and numerals in blocks denote DL subframes relating to UL subframes. For example, a PHICH/UL grant corresponding to a PUSCH of SF#2 is transmitted in SF#2+4 (=SF#6) and a PHICH/UL grant corresponding to a PUSCH of SF#8 is transmitted in SF#8+6 (=SF#14).

PHICH resource allocation will now be described. When a PUSCH is transmitted in subframe #n, the UE determines a PHICH resource corresponding to the PUSCH in subframe #(n+$k_{PHICH}$). In case of FDD, $k_{PHICH}$ has a fixed value (e.g. 4). In case of TDD, $k_{PHICH}$ has a value depending on UL-DL configuration. Table 7 shows $k_{PHICH}$ for TDD is equivalent to Table 6.

TABLE 7

| TDD UL-DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

A PHICH resource is provided by [PHICH group index, orthogonal sequence index]. The PHICH group index and the orthogonal sequence index are determined using (i) a lowest PRB index used for PUSCH transmission and (ii) a 3-bit field value for DMRS (Demodulation Reference Signal) cyclic shift. Here, (i) and (ii) are indicated by a UL grant PDCCH.

A description will be given of a HARQ process. The UE executes a plurality of parallel HARQ processes for UL transmission. The plurality of parallel HARQ processes is used to continuously perform UL transmission while the UE waits for HARQ feedback representing whether previous UL transmission has been successful or not. Each HARQ process relates to a HARQ buffer of a MAC (Medium Access Control) layer. Each HARQ process manages the number of transmissions of a MAC PDU (Physical Data Unit) in the buffer, HARQ feedback for the MAC PDU in the buffer, and a state parameter regarding a current redundancy version.

In case of LTE(-A) FDD, the number of UL HARQ processes for non-subframe bundling operation (i.e. normal HARQ operation) is 8. In case of LTE(-A) TDD, the number of UL HARQ processes and HARQ RTT (Round Trip Time) are configured differently according to DL-UL configurations because the number of UL subframes depends on UL-DL configuration. Here, the HARQ RTT may be a time interval (in the unit of SF or ms, for example) between a time when a UL grant is received and a time when a PHICH (corresponding to the UL grant) is received through transmission of a PUSCH (corresponding the UL grant) or a time interval between a PUSCH transmission time and a PUSCH retransmission time.

The number of UL HARQ processes varies. When subframe bundling is applied, a bundle of PUSCHs configured of 4 contiguous UL subframes is transmitted in FDD and TDD. Accordingly, a HARQ operation/process when subframe bundling is applied is different from the normal HARQ operation/process.

Table 8 shows the number of synchronous UL HARQ processes and HARQ RTT in TDD. When the UL HARQ RTT is 10 [SFs or ms] (UL-DL configurations #1, #2, #3, #4 and #5), one UL HARQ process uses one fixed UL SF timing. When the UL HARQ RTT does not correspond to 10 [SFs or ms] (UL-DL configurations #0 and #6), one UL HARQ process uses a plurality of UL SF timings (instead of one fixed UL SF timing) while hopping. For example, in case of UL-DL configuration #6, PUSCH transmission timings in one UL HARQ process are: SF #2: PUSCH=>SF #13: PUSCH (RTT: 11 SFs)=>SF #24: PUSCH (RTT: 11 SFs)=>SF #37: PUSCH (RTT: 13 SFs)=>SF #48: PUSCH (RTT: 11 SFs)=>SF #52: PUSCH (RTT: 14 SFs).

TABLE 8

| UL-DL configuration | Number of UL SFs | Number of HARQ processes for normal HARQ operation | HARQ RTT |
|---|---|---|---|
| 0 | 6 | 7 | 11 or 13 |
| 1 | 4 | 4 | 10 |
| 2 | 2 | 2 | 10 |
| 3 | 3 | 3 | 10 |
| 4 | 2 | 2 | 10 |
| 5 | 1 | 1 | 10 |
| 6 | 5 | 6 | 11 or 13 or 14 |

In case of TDD UL-DL configurations #1 to #6 and normal HARQ operation, the UE transmits a corresponding PUSCH signal in subframe n+k (refer to Table 5) according to UL grant PDCCH and/or PHICH information upon detection of the UL grant PDCCH and/or PHICH information in subframe n.

In case of TDD UL-DL configuration #0 and the normal HARQ operation, when a UL DCI grant PDCCH and/or a PHICH are detected from subframe n, PUSCH transmission timing of the UE is varied according to conditions. When the MSB (Most Significant bit) of a UL index in DCI is 1 or the PHICH is received through a resource corresponding to $I_{PHICH}=0$ in subframe #0 or #5, the UE transmits the corresponding PUSCH signal in subframe n+k (refer to Table 5). When the LSB (Least Significant bit) of the UL index in the DCI is 1, the PHICH is received through a resource corresponding to $I_{PHICH}=1$ in subframe #0 or #5, or the PHICH is received in subframe #1 or #6, UE transmits the corresponding PUSCH signal in subframe n+7. When both the MSB and LSB in the DCI are set, the UE transmits the corresponding PUSCH signal in subframe n+k (refer to Table 5) and subframe n+7.

Figure 14:
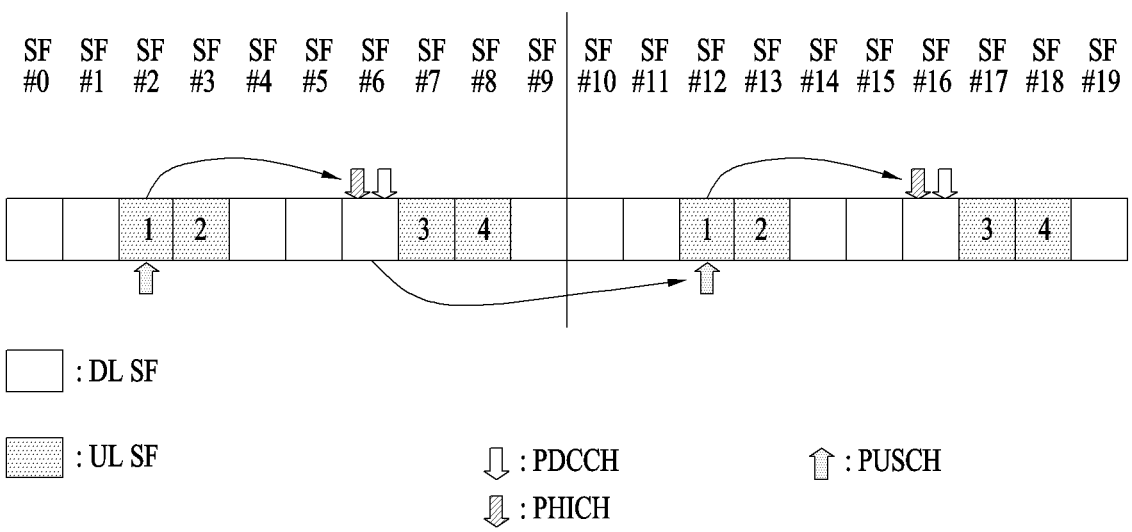
FIG. 14 illustrates a TDD HARQ (Hybrid Automatic Repeat request) process in a single cell situation.

FIG. 14 illustrates a synchronous UL HARQ process when UL-DL configuration #1 is configured. Numerals in blocks denote UL HARQ process numbers. The synchronous UL HARQ process shown in FIG. 14 corresponds to a normal HARQ process. Referring to FIG. 14, HARQ process #1 involves SF#2, SF#6, SF#12 and SF#16. For example, if an initial PUSCH signal (e.g. RV=0) is transmitted in SF#2, a UL grant PDCCH and/or a PHICH corresponding to the PUSCH signal can be received in SF#6 and a (retransmission) PUSCH signal (e.g. RV=2) corresponding to the initial PUSCH signal can be transmitted in SF#12. Accordingly, 4 UL HARQ processes having an RTT (Round Trip Time) of 10 SFs (or 10 ms) are present in case of UL-DL configuration #1.

Figure 15:
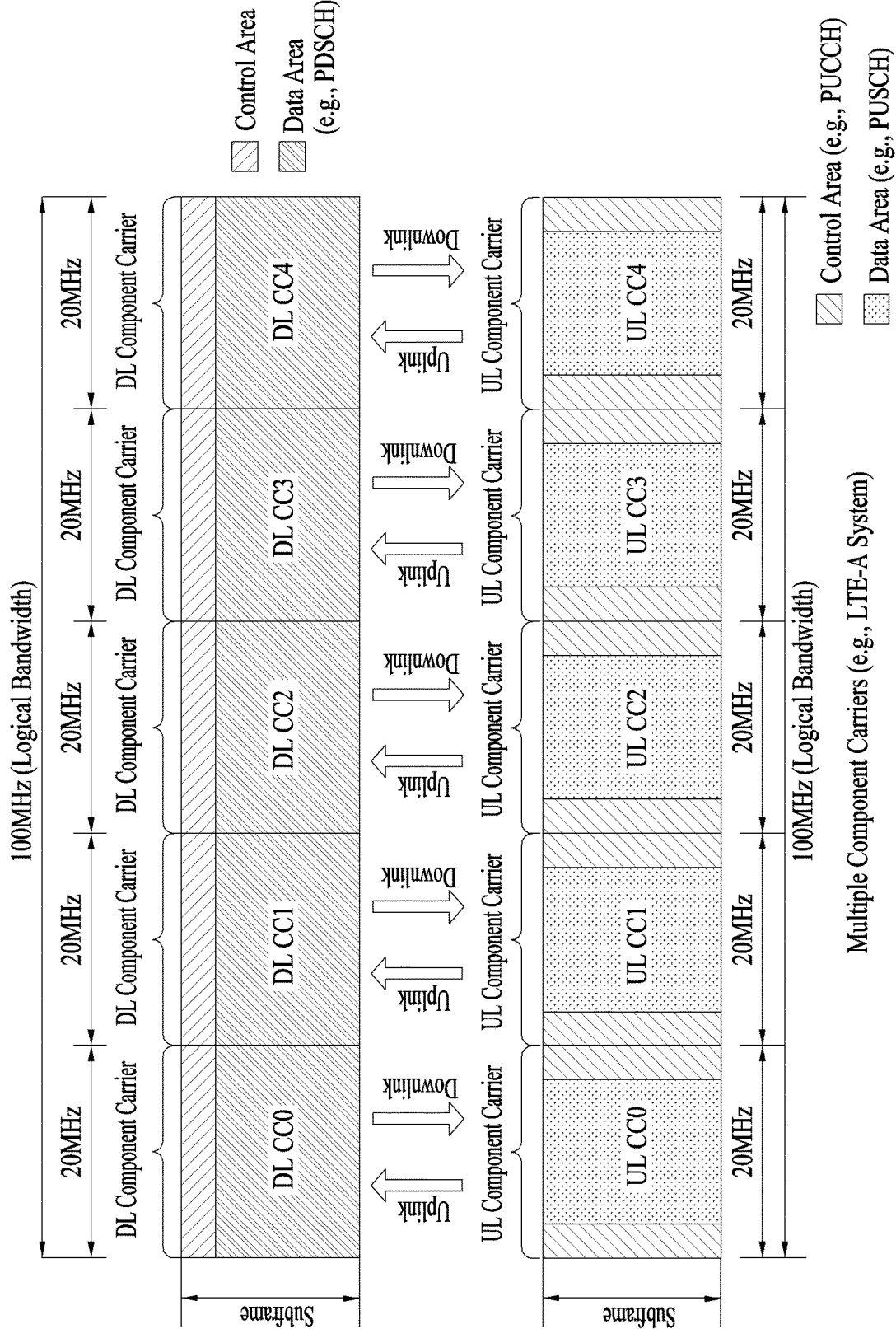
FIG. 15 illustrates a carrier aggregation (CA)-based wireless communication system.

FIG. 15 illustrates carrier aggregation (CA) communication system.

Referring to FIG. 15, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

■ CIF disabled: a PDCCH on a DL CC is used to allocate a PDSCH resource on the same DL CC or a PUSCH resource on a linked UL CC.
  ● No CIF
■ CIF enabled: a PDCCH on a DL CC can be used to allocate a PDSCH or PUSCH resource on a specific DL/UL CC from among a plurality of aggregated DL/UL CCs using the CIF.
  ● LTE DCI format extended to have CIF
    CIF corresponds to a fixed x-bit field (e.g. x=3) (when CIF is set)
    CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 16:
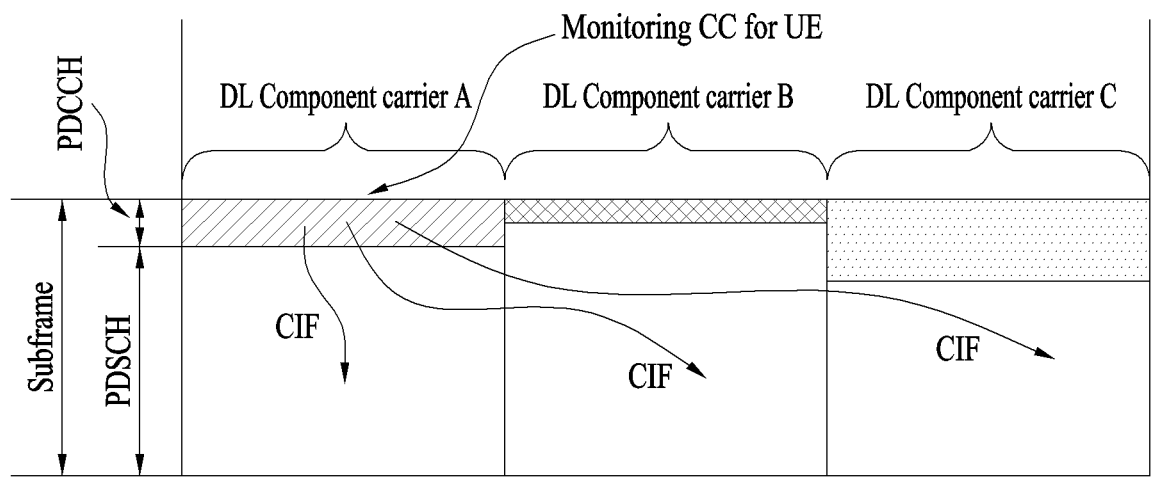
FIG. 16 illustrates cross-carrier scheduling.

FIG. 16 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

As more and more telecommunication devices require greater communication capacity, efficient utilization of limited frequency bands in future wireless communication systems is increasingly important. Basically, the frequency spectrum is divided into a licensed band and an unlicensed band. The licensed band includes frequency bands reserved for specific uses. For example, the licensed band includes government allocated frequency bands for cellular communication (e.g., LTE frequency bands). The unlicensed band is a frequency band reserved for public use and is also referred to as a license-free band. The unlicensed band may be used by anyone without permission or declaration so long as such use meets radio regulations. The unlicensed band is distributed or designated for use by anyone at a close distance, such as within a specific area or building, in an output range that does not interfere with the communication of other wireless stations, and is widely used for wireless remote control, wireless power transmission, Wi-Fi, and the like.

Cellular communication systems such as LTE systems are also exploring ways to utilize unlicensed bands (e.g., the 2.4 GHz band and the 5 GHz band), used in legacy Wi-Fi systems, for traffic off-loading. Basically, since it is assumed that wireless transmission and reception is performed through contention between communication nodes, it is required that each communication node perform channel sensing (CS) before transmitting a signal and confirm that none of the other communication nodes transmit a signal. This operation is referred to as clear channel assessment (CCA), and an eNB or a UE of the LTE system may also need to perform CCA for signal transmission in an unlicensed band. For simplicity, the unlicensed band used in the LTE-A system is referred to as the LTE-U (unlicensed) band. In addition, when an eNB or UE of the LTE system transmits a signal, other communication nodes such as Wi-Fi should also perform CCA in order not to cause interference. For example, in the 801.11ac Wi-Fi standard, the CCA threshold is specified to be −62 dBm for non-Wi-Fi signals and −82 dBm for Wi-Fi signals. Accordingly, the station (STA)/access point (AP) does not perform signal transmission so as not to cause interference when a signal other than Wi-Fi signals are received at a power greater than or equal to −62 dBm. In a Wi-Fi system, the STA or AP may perform CCA and signal transmission if a signal above a CCA threshold is not detected for more than 4 µs.

Figure 17:
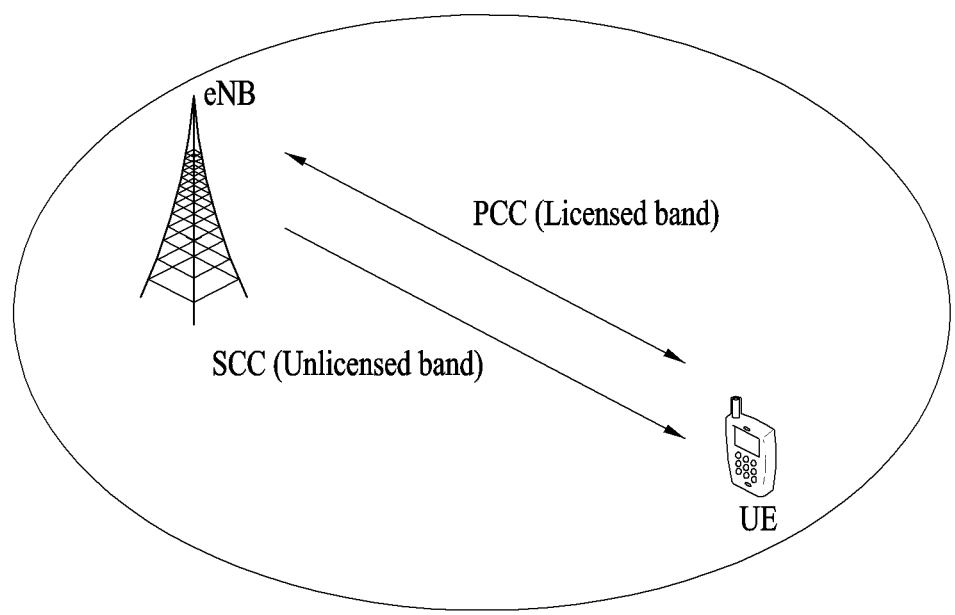
FIG. 17 illustrates carrier aggregation of a licensed band and an unlicensed band.

FIG. 17 illustrates carrier aggregation of a licensed band and an unlicensed band. Referring to FIG. 17, an eNB may transmit a signal to a UE or the UE may transmit a signal to the eNB in a situation of carrier aggregation of the licensed band (hereinafter, LTE-A band, L-band) and the unlicensed band (hereinafter, LTE-U band, U-band). Here, the center carrier or frequency resource of the license band may be interpreted as a PCC or PCell, and the center carrier or frequency resource of the unlicensed band may be interpreted as an SCC or SCell.

Figure 18:
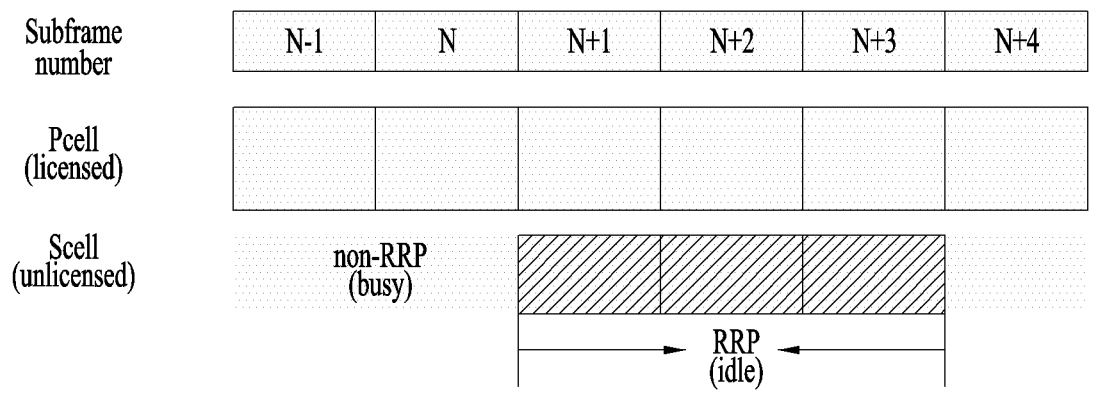
FIGS. 18 and 19 illustrate a method of occupying resources in an unlicensed band.
Figure 19:
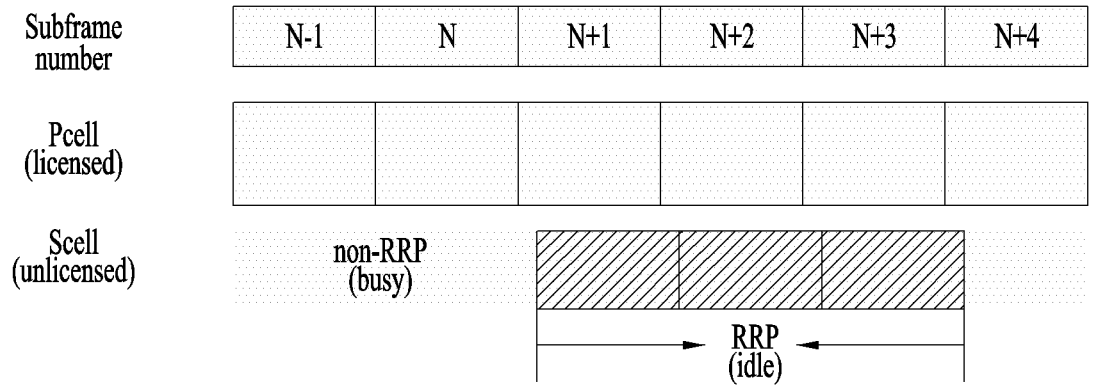

FIGS. 18 and 19 illustrate a method of occupying resources within a licensed band. In order to perform communication between an eNB and a UE in an LTE-U band, the band should be occupied/secured for a specific time period through contention with other communication systems (e.g., Wi-Fi) unrelated to LTE-A. For simplicity, the time period occupied/secured for cellular communication in the LTE-U band is referred to as a reserved resource period (RRP). There are various methods for securing the RRP interval. For example, a specific reservation signal may be transmitted such that other communication system devices such as Wi-Fi can recognize that the corresponding wireless channel is busy. For example, the eNB may continuously transmit an RS and data signal such that a signal having a specific power level or higher is continuously transmitted during the RRP interval. If the eNB has predetermined the RRP interval to occupy in the LTE-U band, the eNB may pre-inform the UE of the RRP interval to allow the UE to maintain the communication transmission/reception link during the indicated RRP interval. The RRP interval information may be transmitted to the UE through another CC (e.g., the LTE-A band) connected through carrier aggregation.

For example, an RRP interval consisting of M consecutive subframes (SF) may be configured. Alternatively, one RRP interval may be configured as a set of non-consecutive SFs (not shown). Here, the eNB may pre-inform the UE through higher layer signaling (e.g., RRC or MAC signaling) or a physical control/data channel of the value of M and the usage of the M SFs (using PCell). The start time of the RRP interval may be set periodically by higher layer signaling (e.g., RRC or MAC signaling). Alternatively, the start time of the RRP interval may be specified through physical layer signaling (e.g., (E)PDCCH) in SF #n or SF # (n−k) when the start time of the RRP interval needs to be set to SF #n. Here, k is a positive integer (e.g., 4).

The RRP may be configured such that the SF boundary and the SF number/index thereof are aligned with the PCell (FIG. 2) (hereinafter, "aligned-RRP"), or configured to support the format in which the SF boundary or the SF number/index is not aligned with the PCell (hereinafter, "floating-RRP") (FIG. 13). In the present invention, the SF boundaries being aligned between cells may mean that the interval between SF boundaries of two different cells is shorter than or equal to a specific time (e.g., CP length or X μs (X≥0)). In addition, in the present invention, a PCell may refer to a cell that is referenced in order to determine the SF (and/or symbol) boundary of a UCell in terms of time (and/or frequency) synchronization.

As another example of operation in the unlicensed band performed in a contention-based random access scheme, the eNB may perform carrier sensing before data transmission/reception. If a current channel status of the SCell is determined as being an idle when the channel status is checked for whether it is busy or idle, the eNB may transmit a scheduling grant (e.g., (E)PDCCH) through the PCell (LTE-A band) or the SCell (LTE-U band), and attempt to perform data transmission/reception on the SCell. For convenience, a serving cell (e.g., PCell and SCell) operating in a licensed band is defined as LCell and a center frequency of the LCell is defined as (DL/UL) LCC. A serving cell (e.g., SCell) operating in an unlicensed band is defined as UCell and a center frequency of the UCell is defined as (DL/UL) UCC. In addition, a case in which a UCell is scheduled from the same cell and a case in which a UCell is scheduled from a different cell (e.g., PCell) are respectively referred to as self-CC scheduling and cross-CC scheduling.

Embodiment: HARQ Based Signal Transmission and Reception

In legacy LTE, an asynchronous HARQ method is applied to DL data (e.g., PDSCH) scheduling and a synchronous HARQ method is applied to UL data (e.g., PUSCH) scheduling. A transmission/retransmission timing for a single HARQ process is aperiodically set in the asynchronous HARQ method, whereas a transmission/retransmission timing for a single HARQ process is periodically set in the asynchronous HARQ method. In an asynchronous DL HARQ method, a HARQ process ID and RV are directly signaled through a DL grant and data transmissions/retransmissions corresponding to the same HARQ process ID may constitute a single HARQ process. On the other hand, in a synchronous UL HARQ method, a specific (periodic) UL SF (number) set (data transmissions/retransmissions through the specific UL SF set) constitute a single HARQ process and an RV is automatically determined according to SF numbers (in a predefined pattern) without additional signaling. Additionally, non-adaptive automatic retransmission may be performed on the basis of only PHICH transmission without transmission of an additional UL grant for scheduling retransmission in the UL HARQ method.

Meanwhile, DL/UL SFs are continuously or periodically configured in a serving cell (i.e., LCell) operating in licensed bands, whereas DL/UL SFs are aperiodically/opportunistically configured according to a CCA result (with respect to UCell radio channels) of an eNB/UE in a serving cell (i.e., UCell) operating in unlicensed bands. Accordingly, an asynchronous HARQ (referred to as async-HARQ) method of performing only UL grant based adaptive retransmission without referring to a PHICH instead of a synchronous HARQ (referred to as sync-HARQ) method of supporting PHICH based non-adaptive automatic retransmission may be applied to UCell UL, distinguished from conventional LCell UL. Therefore, in the case of UCell, a UL HARQ process ID/number and RV (of data transmission signals) may be directly signaled through a UL grant for UL data scheduling (as well as DL data scheduling).

In the case of conventional UL sync-HARQ, retransmission UL grant overhead can be reduced (opportunistically) using a PHICH, but flexibility with respect to UL data scheduling timing may be decreased due to transmission/retransmission timing (period) restrictions on the same HARQ process in an eNB. On the contrary, in the case of UL async-HARQ, flexibility with respect to UL data (transmission/retransmission) scheduling timing is secured by directly signaling a HARQ process ID (simply, HARQ ID) through a UL grant, all retransmissions entail UL grant overhead all the time.

The present invention proposes a hybrid method of combining PHICH based non-adaptive automatic retransmission operation which is the advantage of the UL sync-HARQ method (retransmission UL grant overhead reduction therethrough) with the UL async-HARQ method or switching the two HARQ methods.

Prior to description, a UL HARQ timeline in the case of operation based on sync-HARQ (e.g., PUSCH/PHICH/UL grant timing) is assumed as follows.

UL data (PUSCH) at SF(TX1)=>PHICH (and/or UL grant) reception at SF(phich)=>UL data (PUSCH) at SF(TX2)

Here, an interval (e.g., SF offset) between SF(TX1) and SF(phich) may be predefined as a fixed value K1 and an interval between SF(phich) and SF(TX2) may be predefined as a fixed value K2. K1 and K2 may be set to the same value (e.g., 4) or set to different values (e.g., K1=4 and K2=6 or K1=6 and K2=4). The present invention is not limited to UCell scheduling and is applicable to UL data scheduling with respect to arbitrary cells (including LCell/UCell without distinction of operation band).

(1) Method 1

In this method, a UL grant is configured/transmitted on the basis of async-HARQ by default and HARQ ID and/or RV information may be directly signaled through the UL grant. Accordingly, a UE performs BD only on an async-HARQ based UL grant (async-grant) and does not perform BD on a sync-HARQ based UL grant (sync-grant). Specifically, when PUSCH transmission in SF(TX1) is scheduled through the UL grant (or a PHICH), the UE may detect/receive a PHICH with respect to the corresponding PUSCH transmission and/or a retransmission UL grant (including the same HARQ ID as that with respect to the PUSCH transmission) through SF(phich). In this case, the UE may perform the following operations according to combinations of whether the (retransmission) UL grant has been detected in SF(phich) and PHICH reception information (e.g., ACK or NACK).

1) Case 1-1: When the UL Grant has been Detected (Including a Case in which the PHICH has been Received)

A. Adaptive PUSCH retransmission is performed on the basis of the UL grant through SF(TX2).

B. A value indicated by the UL grant is used as an RV of the PUSCH transmission signal.

2) Case 1-2: When the UL Grant has not been Detected and the PHICH has been Received for NACK A. Non-adaptive automatic retransmission is performed (on the basis of a recently received UL grant) through SF(TX2).

B. A value automatically determined according to a predefined pattern on the basis of a value indicated through a recently received UL grant (or a value applied to a PUSCH signal of the previous SF(TX1) is used as the RV. For example, when the RV of the PUSCH signal of SF(TX1) is 2 when a predefined RV pattern is assumed as 0=>2=>3=>1, the RV of the PUSCH signal of SF(TX2) is determined as 3.

3) Case 1-3: When the UL Grant has not been Detected and the PHICH has been Received for ACK A. UL grant detection is attempted after SF(phich) and, when a UL grant is detected through SF(n), PUSCH retransmission is performed through SF(n+K2). SF(n) refers to an SF between SP(phich) and SF(TX2) (or a specific time before SF(TXs)).

B. A value indicated through the UL grant is used as the RV (identical to case 1-1)

In addition, the retransmission UL grant (including the same HARQ ID as that with respect to PUSCH transmission) for PUSCH transmission in SF(TX1) may be transmitted/detected through SF(n) between SF(TX1) and SF(phich). In this case, PUSCH retransmission may be performed through SF(n+K2) (identical to case 1-3). Further, in a state in which the PHICH has been received for NACK through SF(phich), the UL grant (including the same HARQ ID as that with respect to PUSCH transmission in SF(TX1)) may be detected through SF(n) before SF(TX2) (or a specific time before SF(TX2)). In this case, the UE may drop/abandon PHICH-NACK based non-adaptive automatic retransmission through SF(TX2) and perform adaptive PUSCH retransmission based on the UL grant through SF(n+K2).

This method may be distinguished from the conventional sync-HARQ method in that a PHICH reception timing with respect to a UL HARQ process and a PUSCH automatic retransmission timing according thereto dynamically change according to UL grant detection time. Based on this method, an eNB can select/apply one of operations of case 1-2 (reducing retransmission UL grant overhead based on sync-HARQ operation) and case 1-3 (securing retransmission timing flexibility based on async-HARQ operation).

(2) Method 2

In this method, a UL grant may be configured/transmitted on the basis of async-HARQ (i.e., a HARQ ID and/or RV are included) or configured/transmitted on the basis of sync-HARQ (e.g., a HARQ ID and RV are omitted). Accordingly, a UE may perform BD on both an async-HARQ based UL grant (async-grant) and a sync-HARQ based UL grant (sync-grant). Specifically, when PUSCH transmission in SF(TX1) is scheduled through a UL grant (or PHICH), the UE may detect/receive a PHICH and/or a retransmission sync-grant for the PUSCH transmission through SF(phich). In this case, the UE may perform the following operations according to combinations of whether the (retransmission) sync-grant has been detected in SF(phich) and PHICH reception information (e.g., ACK or NACK).

1) Case 2-1: When the Sync-Grant has been Detected

A. Adaptive PUSCH retransmission is performed through SF(TX2) on the basis of the sync-grant.

B. As the RV of the PUSCH transmission signal, a) a value indicated through the sync-grant is used or b) a value automatically determined according to a predefined pattern on the basis of a value indicated through a recently received UL grant (or a value applied to a PUSCH signal of the previous SF(TX1)) is used.

2) Case 2-2: When the Sync-Grant has not been Detected and the PHICH has been Received for NACK A. Non-adaptive automatic retransmission (based on a recently received UL Grant) is performed through SF(TX2)

B. A value automatically determined according to a predefined pattern on the basis of a value indicated through the recently received UL grant (or a value applied to a PUSCH signal of the previous SF(TX1)) is used as the RV.

3) Case 2-3: When the Sync-Grant has not been Detected and the PHICH has been Received for ACK A. Detection of an async-grant is attempted after SF(phich) and, when an async-grant (including the same HARQ process ID as that with respect to the PUSCH transmission in SF(TX1)) is detected through SF(n), PUSCH retransmission in SF(TX1) is performed through SF(n+K2). SF(n) refers to an SF between SF(phich) and SF(TX2) (or a specific time before SF(TX2)).

B. A value indicated through the async-grant is used as the RV. The HARQ process ID may be determined from the number of an SF in which recent PUSCH transmission has been performed (for example, HARQ ID may be determined by mod (SF number, K1+K2). Here, mod (A, B) refers to a remainder obtained by dividing A by B.

Furthermore, a retransmission async-grant (including a HARQ process ID determined from the SF number of SF(TX1)) for PUSCH transmission in SF(TX1) may be transmitted/detected through SF(n) between SF(TX1) and SF(phich). In this case, PUSCH retransmission may be performed through SF(n+K2) (identical to case 2-3). A sync-grant and an async-grant Alt 2-1) may have the same payload size or Alt 2-2) may have different payload sizes. In the case of Alt 2-1), a grant may include a flag/indicator indicating whether the grant is a sync-grant or an async-grant. In the case of Alt 2-2), an (E)PDCCH SS for detecting (BD) each grant may be exclusively configured/set.

(3) Method 3

In this method, all UL SFs are divided into two SF sets, sync-HARQ may be applied to one UL SF set (PUSCH transmission therethrough) and async-HARQ may be applied to the other UL SF set (PUSCH transmission therethrough). Specifically, in a DL SF set (i.e., configured as a UL grant (and/or PHICH) transmission timing for each UL SF set) corresponding to each UL SF set, only a UL grant (and/or a PHICH) based on the HARQ method applied to the corresponding UL SF set may be transmitted/detected. A UE may perform BD only on the sync-grant (and PHICH) in DL SF set 1 corresponding to UL SF set 1 to which sync-HARQ is applied. In addition, the UE may perform BD only on the async-grant (without receiving/referring to the PHICH) in DL SF set 2 corresponding to UL SF set 2 to which async-HARQ is applied. For example, when a sync-grant and/or a PHICH are detected/received through DL SF set 1, corresponding PUSCH transmission/retransmission may be performed through UL SF set 1 (that is, the sync-grant/PHICH which schedules UL SF set 1 is transmitted through DL SF set 1). When an async-grant is detected through DL SF set 2, corresponding PUSCH transmission/retransmission may be performed through UL SF set 2 (that is, the async-grant which schedules UL SF set 2 is transmitted through DL SF set 2).

Alternatively, it may be possible to consider a method in which a sync-grant and an async-grant are configured/transmitted on the basis of Alt 2-1/2-2 of Method 2 (in a state in which UL SF sets have not been preset) and a UE performs detection (BD) of the sync-grant and the async-grant, wherein the HARQ method applied to a grant which schedules initial data (PUSCH) transmission is applied to all retransmissions of the PUSCH. For example, PUSCH transmission in a UL SF (e.g., SF(n)) may be scheduled through a sync-grant. In this case, the UE may detect/receive a PHICH and/or the sync-grant for the corresponding PUSCH transmission in a DL SF (e.g., SF(n+K1)) corresponding to UL SF(n) and perform retransmission of the PUSCH through a UL SF (e.g., SF(n+K1+K2) corresponding to DL SF(n+K1). Additionally, PUSCH transmission in a UL SF (e.g., SF(n)) may be scheduled through an async-grant. In this case, the UE may detect the retransmission async-grant (including the same HARQ ID as that with respect to the PUSCH transmission) for the corresponding PUSCH (without receiving/referring to PHICH) from the subsequent DL SF. The UE may perform retransmission of the corresponding PUSCH through a UL SF (e.g., SF(n+L+K2)) corresponding to the time (e.g., SF(n+L)) at which the retransmission async-grant has been detected.

Meanwhile, async-HARQ (e.g., async-grant) based PUSCH transmission may be scheduled at a sync-HARQ based PUSCH transmission (e.g., PHICH-NACK based non-adaptive retransmission) timing in Methods 1 to 3 (or other methods) (that is, two PUSCH transmissions are simultaneously scheduled in a single UL SF). In this case, the UE may perform PUSCH transmission through the following methods.

1) Alt 3-1: Sync-HARQ Based PUSCH Transmission is Dropped and Only Async-HARQ Based PUSCH Transmission is Performed.

A. This is applicable irrespective of whether PUSCH resources overlap.

2) Alt 3-2: A Sync-HARQ Based PUSCH and an Async-HARQ Based PUSCH are Simultaneously Transmitted.

A. When two PUSCH resources overlap, a) a sync-HARQ based PUSCH may be mapped/transmitted only to/in resources other than the overlap resources (e.g., rate-matching or puncturing is applied) or b) Alt 3-1 may be applied.

Further, it may be possible to consider a method of applying HARQ process ID and RV indication based async-HARQ to a PUSCH scheduled through an (E)PDCCH USS and applying SF index and RV cycling based sync-HARQ to a PUSCH scheduled through a PDCCH CSS. Alternatively, a method of applying async-HARQ to both a PUSCH scheduled through a CSS and a PUSCH scheduled through a USS may be considered. In this case, a specific HARQ process ID allocated to a PUSCH scheduled through a CSS may be predefined/preset. For example, the HARQ process ID may be designated as an ID having a lowest (or highest) value. In addition, an RV applied to a PUSCH scheduled through a CSS may be predefined/preset as a specific value. For example, the RV may be designated as an RV having a lowest value.

Alternatively, a PUSCH HARQ timing (e.g., a delay between PUSCH transmission time corresponding to UL grant reception time) may be configured differently for a PUSCH scheduled through a CSS and a PUSCH scheduled through a USS. For example, a HARQ delay of the CSS based PUSCH may be set to be greater than a HARQ delay of the USS based PUSCH. In this case, the HARQ delay of the CSS based PUSCH may be set to the conventional delay (FDD=4 SFs, TDD=Table 5). On the contrary, the HARQ delay of the USS based PUSCH may be set to the conventional delay (FDD=4 SFs, TDD=Table 5). In this situation, the UE may operate to perform only USS based PUSCH transmission having a smaller HARQ delay (i.e., a UL grant received later) when the transmission time of the PUSCH scheduled through the CSS overlaps the transmission time of the PUSCH scheduled through the USS. Here, CSS based PUSCH transmission having a larger HARQ delay (i.e., a UL grant received earlier) may be dropped. In this method, the CSS based PUSCH and the USS based PUSCH may be replaced by a plurality of PUSCHs having different HARQ delays. In this case, an operation principle similar to the aforementioned operation principle is applicable.

Figure 20:
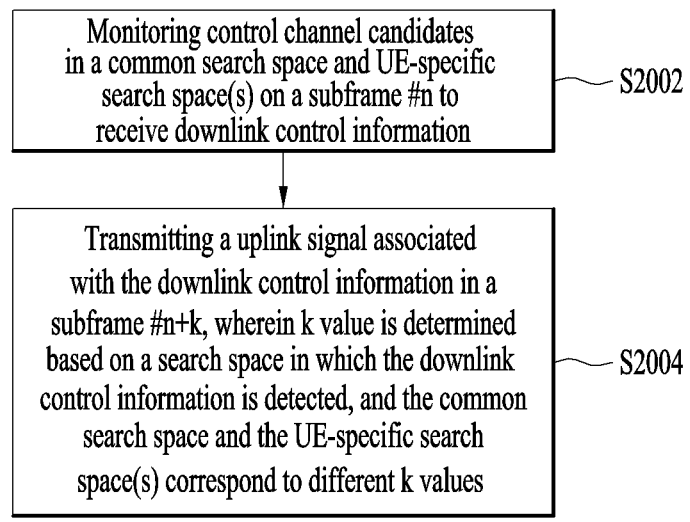
FIG. 20 illustrates a signal transmission process according to the present invention.

FIG. 20 illustrates a signal transmission process according to an embodiment of the present invention.

Referring to FIG. 20, a UE may receive a subframe #n including a common search space (CSS) and a UE-specific search space (USS) (not shown). When cross-CC scheduling is configured, there may be a plurality of USSs. Subsequently, the UE may monitor the CSS and the USS in subframe #n and receive downlink control information (S2002). Monitoring an SS includes blind decoding of control channel candidates (e.g., PDCCH candidates) in the SS. Then, the UE may transmit an uplink signal associated with the downlink control information in a subframe #n+k (S2004). Here, n is an integer equal to or greater than 0 and k is a positive integer indicating a subframe spacing between the downlink control information reception time and the uplink signal transmission time. In the present invention, k is determined on the basis of an SS in which the downlink control information is detected and the CSS and the USS may correspond to different k values. For example, k is k1 when the downlink control information is detected in the CSS and k is k2 when the downlink control information is detected in the USS. k1 may be greater than k2. When (i) transmission of a first uplink signal associated with downlink control information detected in a CSS of a subframe #m−k1 and (ii) transmission of a second uplink signal associated with downlink control information detected in a USS of the subframe #m−k1 are simultaneously requested in subframe #m, transmission of the first uplink signal may be dropped. The downlink control information may be received through a Physical Downlink Control Channel (PDCCH) and the uplink signal may be transmitted through a Physical Uplink Shared Channel (PUSCH). The downlink control information may include a PDCCH and the uplink signal may include a PUSCH. A wireless communication system may include an LTE-based wireless communication system.

Figure 21:
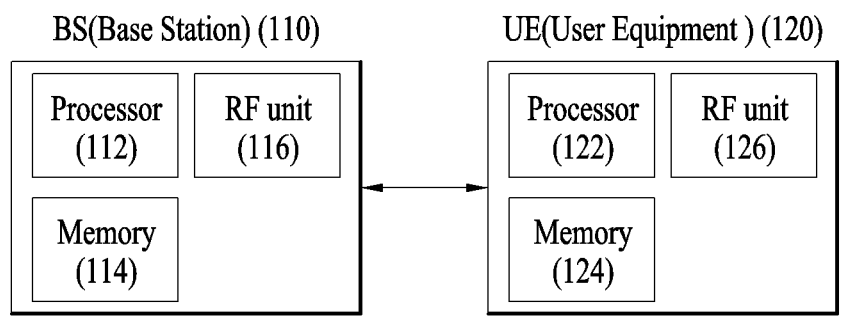
FIG. 21 illustrates a base station and user equipment applicable to an embodiment of the present invention.

FIG. 21 illustrates a BS and a UE of a wireless communication system, which are applicable to embodiments of the present invention.

Referring to FIG. 21, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to UEs, eNBs or other apparatuses.

The invention claimed is:

1. A method for transmitting an uplink signal by a user equipment (UE) in a wireless communication system, the method comprising:
monitoring control channel candidates in a common search space and a UE-specific search space on a subframe #n to receive downlink control information; and
transmitting, in subframe #n+k, an uplink signal associated with the downlink control information,
wherein k is k1 and a subframe-based synchronous Hybrid Automatic Repeat reQuest (HARQ) retransmission procedure is applied to the uplink signal, based on the downlink control information being detected in the common search space,
wherein k is k2 (k2<k1) and a HARQ process ID-based asynchronous retransmission procedure is applied to the uplink signal, based on the downlink control information being detected in the UE-specific search space, and
wherein, when (i) transmission of a first uplink signal associated with downlink control information detected in a common search space of a subframe #m−k1 and (ii) transmission of a second uplink signal associated with downlink control information detected in a UE-specific search space of a subframe #m−k2 are simultaneously requested in a subframe #m, transmission of the first uplink signal is dropped.

2. The method according to claim 1, wherein the downlink control information includes uplink scheduling information and the uplink signal includes uplink data.

3. The method according to claim 2, wherein the downlink control information is received through a Physical Downlink Control Channel (PDCCH) and the uplink signal is transmitted through a Physical Uplink Shared Channel (PUSCH).

4. The method according to claim 1, wherein the wireless communication system includes a Long Term Evolution (LTE)-based wireless communication system.

5. A user equipment (UE) used in a wireless communication system, the UE comprising:
a transmitter and a receiver; and
a processor, operatively coupled to the transmitter and the receiver,
wherein the processor is configured to:
monitor control channel candidates in a common search space and a UE-specific search space on a subframe #n to receive downlink control information, and
transmit, in subframe #n+k, an uplink signal associated with the downlink control information,
wherein k is k1 and a subframe-based synchronous Hybrid Automatic Repeat reQuest (HARQ) retransmission procedure is applied to the uplink signal, based on the downlink control information being detected in the common search space,
wherein k is k2 (k2<k1) and a HARQ process ID-based asynchronous retransmission procedure is applied to the uplink signal, based on the downlink control information being detected in the UE-specific search space, and wherein, when (i) transmission of a first uplink signal associated with downlink control information detected in a common search space of a subframe #m−k1 and (ii) transmission of a second uplink signal associated with downlink control information detected in a UE-specific search space of a subframe #m−k2 are simultaneously requested in a subframe #m, transmission of the first uplink signal is dropped.

6. The UE according to claim 5, wherein the downlink control information includes uplink scheduling information and the uplink signal includes uplink data.

7. The UE according to claim 6, wherein the downlink control information is received through a Physical Downlink Control Channel (PDCCH) and the uplink signal is transmitted through a Physical Uplink Shared Channel (PUSCH).

8. The UE according to claim 5, wherein the wireless communication system includes a Long Term Evolution (LTE)-based wireless communication system.

* * * * *